United States Patent [19]

Yoshizaki et al.

[11] Patent Number: 5,757,164

[45] Date of Patent: May 26, 1998

[54] APPARATUS FOR SUPPLYING ELECTRIC POWER TO ELECTRICALLY HEATED CATALYSTS ATTACHED TO THE EXHAUST GAS PASSAGE OF A VEHICLE

[75] Inventors: Kouji Yoshizaki, Numazu; Yukio Terashima, Mishima, both of Japan

[73] Assignee: Toyota Jidosha Kabushiki Kaisha, Aichi, Japan

[21] Appl. No.: 662,853

[22] Filed: Jun. 12, 1996

[30] Foreign Application Priority Data

Jun. 14, 1995 [JP] Japan .................. 7-147346

[51] Int. Cl.$^6$ .................. H02P 9/10
[52] U.S. Cl. .................. 322/8; 322/94; 322/28; 60/284; 60/286
[58] Field of Search .................. 322/8, 28

[56] References Cited

U.S. PATENT DOCUMENTS

| | | | |
|---|---|---|---|
| 4,084,126 | 4/1978 | Clements | 322/8 |
| 4,684,818 | 8/1987 | Carlson | 307/10 R |
| 5,210,480 | 5/1993 | Iwatani et al. | 322/28 |
| 5,390,493 | 2/1995 | Fujishita et al. | 60/284 |
| 5,404,720 | 4/1995 | Laing | 60/284 |
| 5,512,789 | 4/1996 | Lyon | 307/10.1 |
| 5,553,451 | 9/1996 | Harada | 60/277 |
| 5,555,725 | 9/1996 | Shimasaki et al. | 60/277 |
| 5,580,477 | 12/1996 | Oota et al. | 219/494 |
| 5,609,024 | 3/1997 | Fujiwara et al. | 60/284 |

FOREIGN PATENT DOCUMENTS

| | | |
|---|---|---|
| 0604868 | 7/1994 | European Pat. Off. . |
| 5-312029 | 11/1993 | Japan . |
| 1483033 | 8/1977 | United Kingdom . |

*Primary Examiner*—Steven L. Stephan
*Assistant Examiner*—Nicholas Ponomarenko
*Attorney, Agent, or Firm*—Kenyon & Kenyon

[57] ABSTRACT

An apparatus for supplying electric power to heating devices of a vehicle, making it possible to utilize the maximum amount of electric power generated by an alternator when a plurality of electrically heated catalysts mounted on the vehicle are to be supplied with electric power from the alternator only. The apparatus for supplying electric power to the heating devices of the vehicle comprises the alternator driven by a drive source of the vehicle to generate electricity, a battery charging circuit contained in the alternator, and a battery capable of being charged or discharged, wherein between the stator coil of the alternator and the battery charging circuit are provided a change-over switch for connecting a rectifier that rectifies the electric power generated in the stator coil to either the electrically heated catalysts or the battery charging circuit, and another change-over switch for connecting the rotor coil to either the battery charging circuit or ground, so that, when the battery is not being charged, the output of the stator coil is supplied to the output terminals of the alternator and that the rotor coil is connected to the battery. The two electrically heated catalysts are connected in series with the output terminals, the outer cylinders of the two electrically heated catalysts being grounded. When the electrically heated catalysts are to be heated, the electric power is supplied directly from the alternator and the ability of the alternator is utilized to the maximum degree.

1 Claim, 5 Drawing Sheets

APPARATUS FOR SUPPLYING ELECTRIC POWER TO ELECTRICALLY HEATED CATALYSTS ATTACHED TO THE EXHAUST GAS PASSAGE OF A VEHICLE

BACKGROUND OF THE INVENTION

1. Field of the Invention

The present invention relates to an apparatus for supplying electric power to electrically heated catalysts of a vehicle. More particularly, the invention relates to an apparatus for supplying electric power to electrically heated catalysts attached to the exhaust gas passage of an automobile when the catalysts are cold, such as during cold starting of an internal combustion engine, in order to promote the activation of the catalysts.

2. Description of the Related Art

Exhaust gases emitted from an internal combustion engine of a vehicle contain such impurities as HC (hydrocarbons), CO (carbon monoxide) and NOx (nitrogen oxides). In an exhaust gas passage of an internal combustion engine a catalytic converter is usually provided which is a device for removing impurities contained in the exhaust gases. However, it has been known that when the temperature of the catalyst is low (in an inactive state), the three-way catalyst used in the catalytic converter works to remove only some of the impurities contained in the exhaust gases. Therefore, when the catalytic converter is in the inactive state after cold starting of the internal combustion engine, the exhaust gases cannot be cleaned to a sufficient degree.

There has been proposed a device for cleaning exhaust gases which is installed in the exhaust gas passage on the upstream side of the catalytic converter, the device incorporating an electrically heated second catalytic converter (EHC: electrically heated catalyst) carrying an oxidizing catalyst and having an electric heater. According to this device for cleaning exhaust gases, when the catalytic converter is still inactive, the second catalytic converter is electrically heated to activate the oxidizing catalyst and to promote the removal of HC.

The electrically heated catalyst is usually served with electric power from a battery. During cold starting of the internal combustion engine, however, the capacity of the battery is low. If a large amount of power is supplied from the battery to the electrically heated catalyst in such a state, the battery voltage drops and this is detrimental to the life of the battery. It can therefore be contrived to supply the output of an alternator, which electrically charges the battery, directly to the electrically heated catalyst.

Technology for supplying electric power from the alternator directly to the load that consumes electric power has been disclosed in Japanese Examined Patent Publication (Kokoku) No. 61-33735.

According to the technology disclosed in Japanese Examined Patent Publication (Kokoku) No. 61-33735, when the electric power is to be supplied from the alternator to a particular heating device, the alternator is disconnected from the battery, and all the output of the alternator is supplied to the particular heating device. In this patent publication, the particular heating device is a defogger provided in the rear window of a vehicle. In order that the electric power of the alternator can be effectively used for the defogger, the circuit for charging the battery from the alternator is disconnected, and all the electric power of the alternator is supplied to the defogger.

The technology disclosed in Japanese Examined Patent Publication (Kokoku) No. 61-33735 can be also applied to an apparatus for supplying electric power to a heating device of a vehicle. When the technology disclosed in Japanese Examined Patent Publication (Kokoku) No. 61-33735 is applied to the apparatus for supplying electric power to the heating device of the vehicle, the output of the alternator can be utilized to a maximum degree when only one electrically heated catalyst is employed with its negative electrode being grounded. However, remains a problem in that a plurality of electrically heated catalysts, which are connected in parallel, are used, the available electric power generated by the alternator cannot be utilized to the maximum degree.

SUMMARY OF THE INVENTION

The object of the present invention is to provide an apparatus for supplying electric power to a heating device of a vehicle, which makes it possible to utilize the maximum degree of electric power generated by the alternator when the electric power is supplied from the alternator to only the electrically heated catalysts that are being heated despite of the fact that the vehicle has a plurality of electrically heated catalysts without permitting an increase in the electric resistance of these electrically heated catalysts.

The present invention is concerned with an apparatus for supplying electric power to a heating device of a vehicle, comprising two heating loads which are heated upon being supplied with electric power, another load to which electric power is supplied, a circuit for supplying electric power to these loads, a battery connected to said circuit and is capable of being electrically charged or discharged, an alternator driven by a drive source of the vehicle to generate electricity, and a battery charging circuit connected to the alternator to electrically charge the battery, wherein the alternator is provided with two additional output terminals, a circuit between the alternator and the battery charging circuit is provided with a change-over switch which, in a first state, electrically connects the alternator to the two output terminals and, in a second state, electrically connects the alternator to the battery charging circuit, two heating loads are electrically connected in series between the two output terminals, and a point of connection of these two heating loads is grounded.

Here, it is desired to provide a second change-over switch in a circuit which connects an end of a field coil of the alternator to a field current control terminal of the battery charging circuit, in order to ground the end of the field coil in the first state.

The invention is concerned with an apparatus, for supplying electric power to a heating device of a vehicle, comprising an alternator driven by a drive source of the vehicle to generate electricity, a battery charging circuit electrically connected to the alternator to electrically charge the battery, and a battery capable of being electrically charged or discharged, wherein the alternator is provided with two additional output terminals, and a change-over switch is provided between the alternator and the battery charging circuit. The change-over switch, in a first state, electrically connects the alternator to the two output terminals and, in a second state, electrically connects the alternator to the battery charging circuit. Two heating loads are electrically connected in series between the two output terminals, and a point of connection of these two heating loads is grounded. Moreover, a second change-over switch is provided in a circuit which connects an end of a field coil of the alternator to a field current control terminal of the battery charging circuit, in order to ground the end of the field coil in the first state. In the first state, therefore, a field current flows from the battery into the field coil so that the alternator generates a large electric power. As a result, the electrode, which is not grounded, of one heating load is supplied with electric power from the output terminal of the positive side of the alternator, and the electrode, which is not grounded, of the other heating load is supplied with electric power from the output terminal of the negative side of the alternator.

BRIEF DESCRIPTION OF THE DRAWINGS

The present invention will be more clearly understood from the description as set forth below with reference to the accompanying drawings, wherein.

DESCRIPTION OF THE PREFERRED EMBODIMENTS

Before describing the preferred embodiments, an explanation will be given of the conventional apparatus for supplying power to an electrically heated catalyst attached to the exhaust gas passage of a vehicle with reference to FIGS. 1 to 3.

Figure 1:
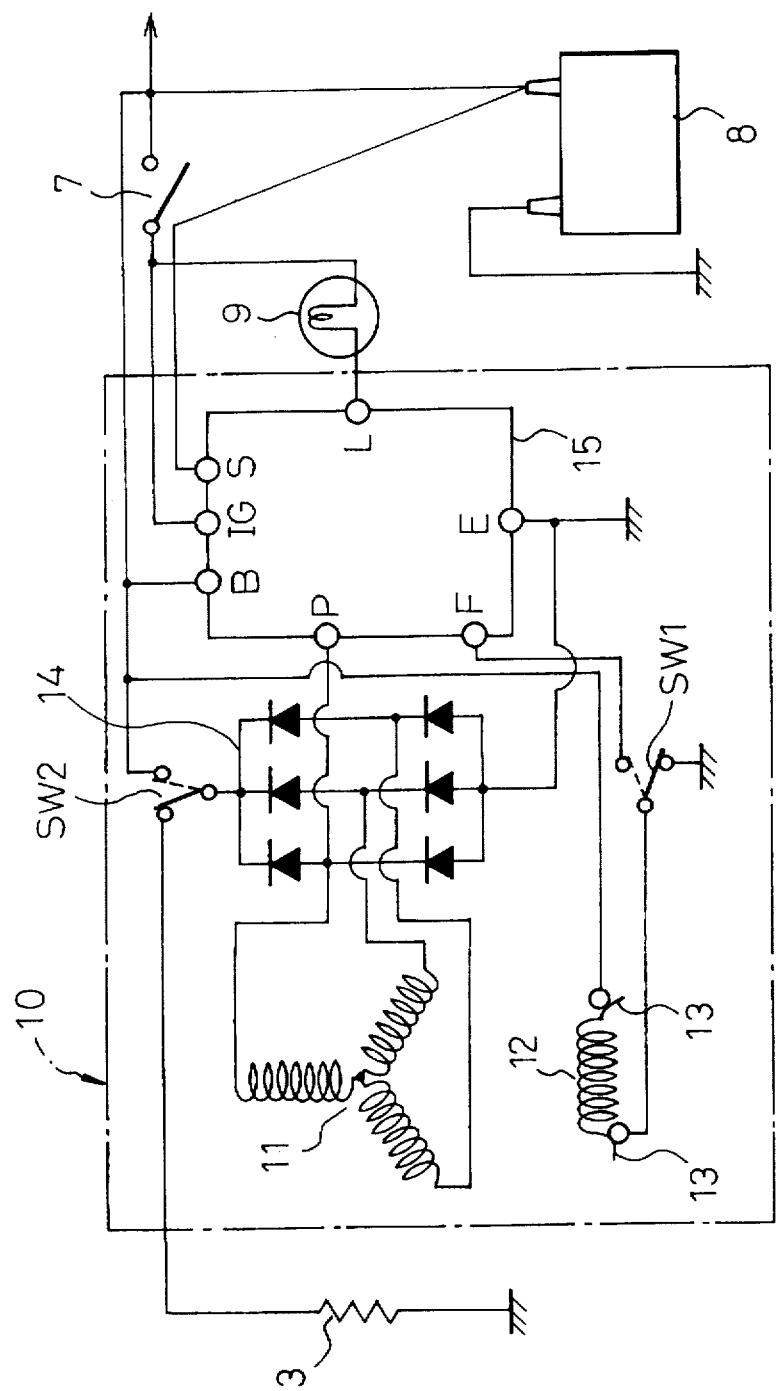
FIG. 1 is a circuit diagram illustrating the constitution of an apparatus for supplying electric power directly from an alternator to an electrically heated catalyst of a vehicle relying upon a prior art.

FIG. 1 illustrates a case where the technology disclosed in the above-mentioned Japanese Examined Patent Publication (Kokoku) No. 61-33735 is applied to an apparatus for supplying electric power to a heating device of a vehicle. In FIG. 1, reference numeral 10 denotes an alternator which contains a three-phase star-connected stator coil 11, a rotor coil 12 which is a field coil, brushes 13, a three-phase full-wave rectifier 14 made up of a diode bridge, an IC regulator 15, and change-over switches SW1 and SW2. The change-over switch SW1 connects an end of the rotor coil 12 to ground (earth) or to the IC regulator 15. The change-over switch SW2 connects the common cathode of the three-phase full-wave rectifier 14 to the IC regulator 15 or to the electrically heated catalyst 3. The IC regulator 15 has a charging terminal B, an ignition terminal IG connected to an ignition switch 7, a lamp terminal L connected to a charge lamp 9, a field current terminal F connected to the rotor coil 12, a phase terminal P connected to one of the phases of the stator coil 11, and an earth terminal E that is grounded. The other end of the charge lamp 9 is connected to the ignition switch 7, and the other end of the ignition switch 7 is connected to a battery 8 and to an electric circuit (not shown) of an automobile.

In the thus constituted apparatus for supplying power to the heating device of a vehicle, the change-over switches SW1 and SW2 are connected as shown by dotted lines in an ordinary state where the ignition switch 7 is turned on. In this case, the electric power generated in the stator coil 11 is rectified through the three-phase full-wave rectifier 14 and is input to the battery 8 via the IC regulator 15. The charge lamp 9 turns on.

Immediately after the start of the internal combustion engine by turning the ignition switch 7 on, the change-over switches SW1 and SW2 are connected as shown by solid lines, and all the electric power generated in the stator coil 11 is rectified through the three-phase full-wave rectifier 14 and is input to the electrically heated catalyst 3. The charge lamp 9 is not turned on.

According to the technology disclosed in the Japanese Examined Patent Publication (Kokoku) No. 61-33735, the output of the alternator can be utilized to a maximum degree in a constitution equipped with a single electric load of which the negative electrode is grounded, such as a defogger or an electrically heated catalyst. When a plurality of electrically heated catalysts are employed and are connected in parallel, however, the available electric power generated by the alternator can no longer be utilized to the maximum degree.

This problem will be described in further detail with reference to FIG. 2.

Figure 2:
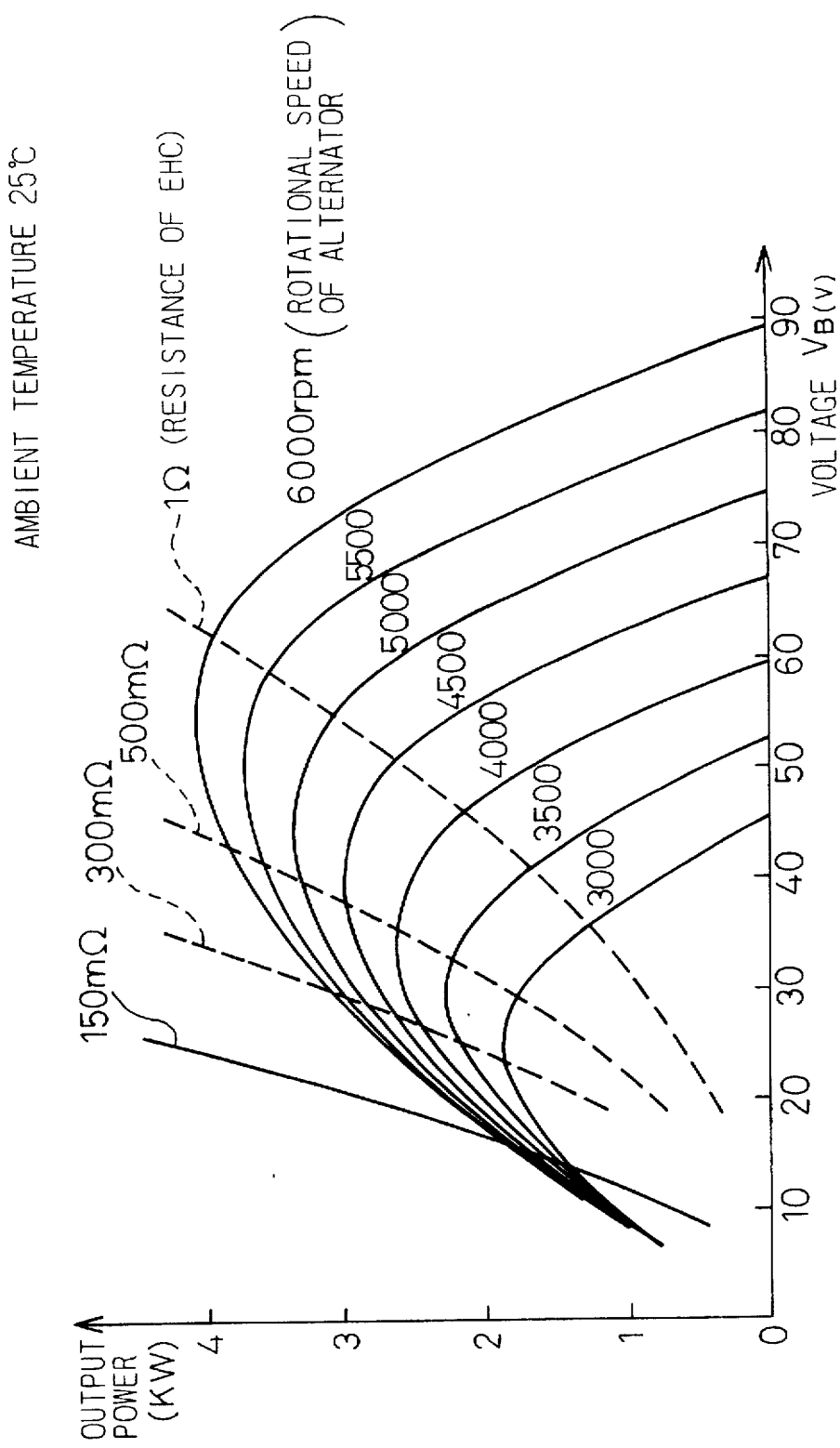
FIG. 2 is a diagram explaining a problem in a conventional circuit when one electrically heated catalyst is employed, and illustrates a relationship between the voltage and the output characteristics of an alternator with the resistance of the electrically heated catalyst and the running speed of the engine as parameters.
Figure 3:
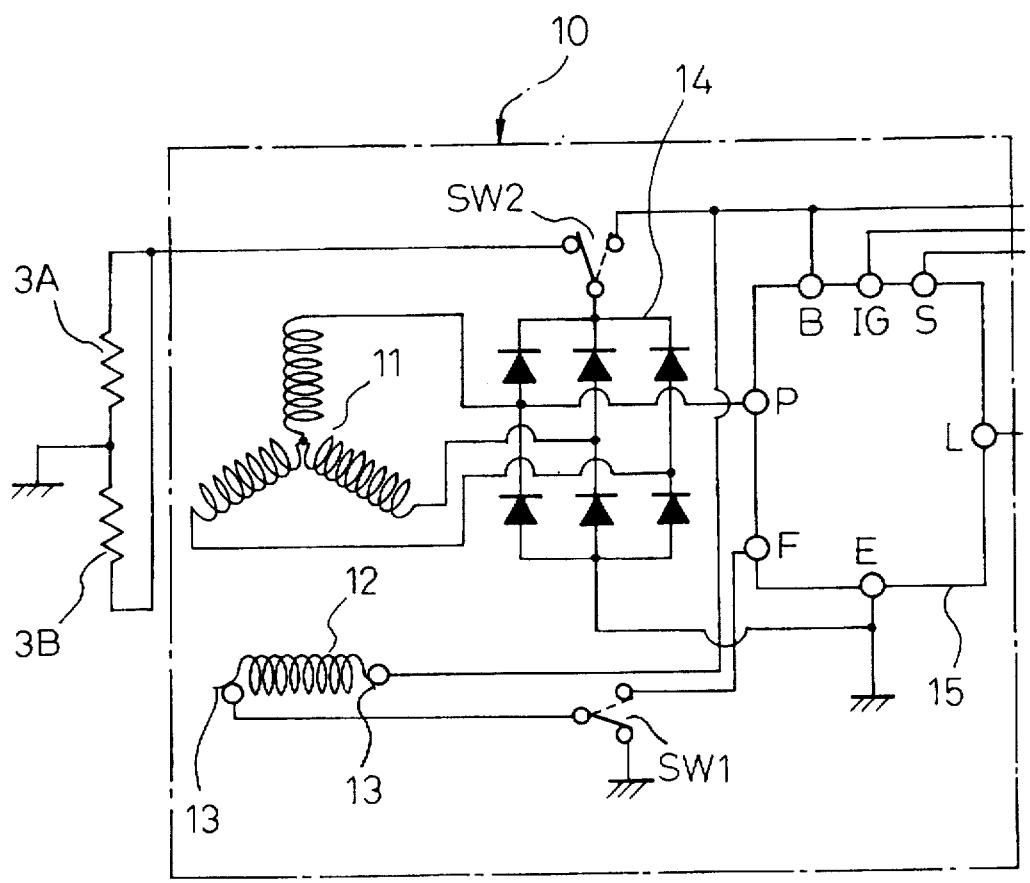
FIG. 3 is a circuit diagram illustrating the constitution of an apparatus for supplying electric power directly from an alternator to two electrically heated catalysts of a vehicle relying upon a prior art.

The maximum electric power supplied from the alternator is greatly affected by an electric resistance of the electrically heated catalyst, which is a load, as will be obvious from the voltage-output characteristics of the alternator shown in FIG. 2 (diagram illustrating a relationship between the running speed and the electric power supplied from the alternator). In FIG. 2, the electric power supplied from the alternator changes greatly with a change in the electric resistance of the electrically heated catalyst. In the case of the electrically heated catalyst, it will be understood from FIG. 2 that an optimum state is established when the resistance is set to be $0.5\Omega$ (500 m$\Omega$).

The applicant has filed many applications concerning an electrically heated catalyst comprising an outer cylinder which is a negative electrode and a metal catalyst carrier which is contained in the outer cylinder and is joined thereto without being insulated (see, for example, Japanese Unexamined Patent Publication (Kokai) No. 7-54644). The circuit constitution for supplying electric power to the electrically heated catalyst is such that the electric current flows from a center electrode which is a positive electrode to the outer cylinder which is a negative electrode, the outer cylinder which is the negative electrode being grounded to the body of the vehicle. When the vehicle has only one electrically heated catalyst, therefore, the electric resistance of the electrically heated catalyst may be set to be $0.5\Omega$ in compliance with the prior art disclosed in the above-mentioned patent publication to utilize the output of the alternator to the maximum degree.

When the vehicle has a plurality of electrically heated catalysts, for example, two electrically heated catalysts, however, the application of the prior art disclosed in the above-mentioned patent publication causes the following problems.

(1) When the vehicle has two electrically heated catalysts, the outer cylinders which are the negative electrodes are grounded to the body due to the circuit constitution of the electrically heated catalysts. As shown in FIG. 3, therefore, the two electrically heated catalysts 3A and 3B are connected in parallel with the alternator 10. In order that the two electrically heated catalysts 3A and 3B connected in parallel will exhibit an optimum electric resistance of 0.5Ω, each of the electrically heated catalysts 3A and 3B must have an electric resistance of 1Ω which is twice as great as 0.5Ω.

(2) In order that the electrically heated catalyst has an electric resistance of 1Ω, the structure of the catalyst (metal carrier) must be changed. This cannot be easily accomplished with the electrically heated catalyst of the present structure.

(3) As a result, the electric resistance of the electrically heated catalyst cannot be set to be 1Ω, and the electric power generated by the alternator 10 cannot be utilized to the maximum degree.

Figure 4:
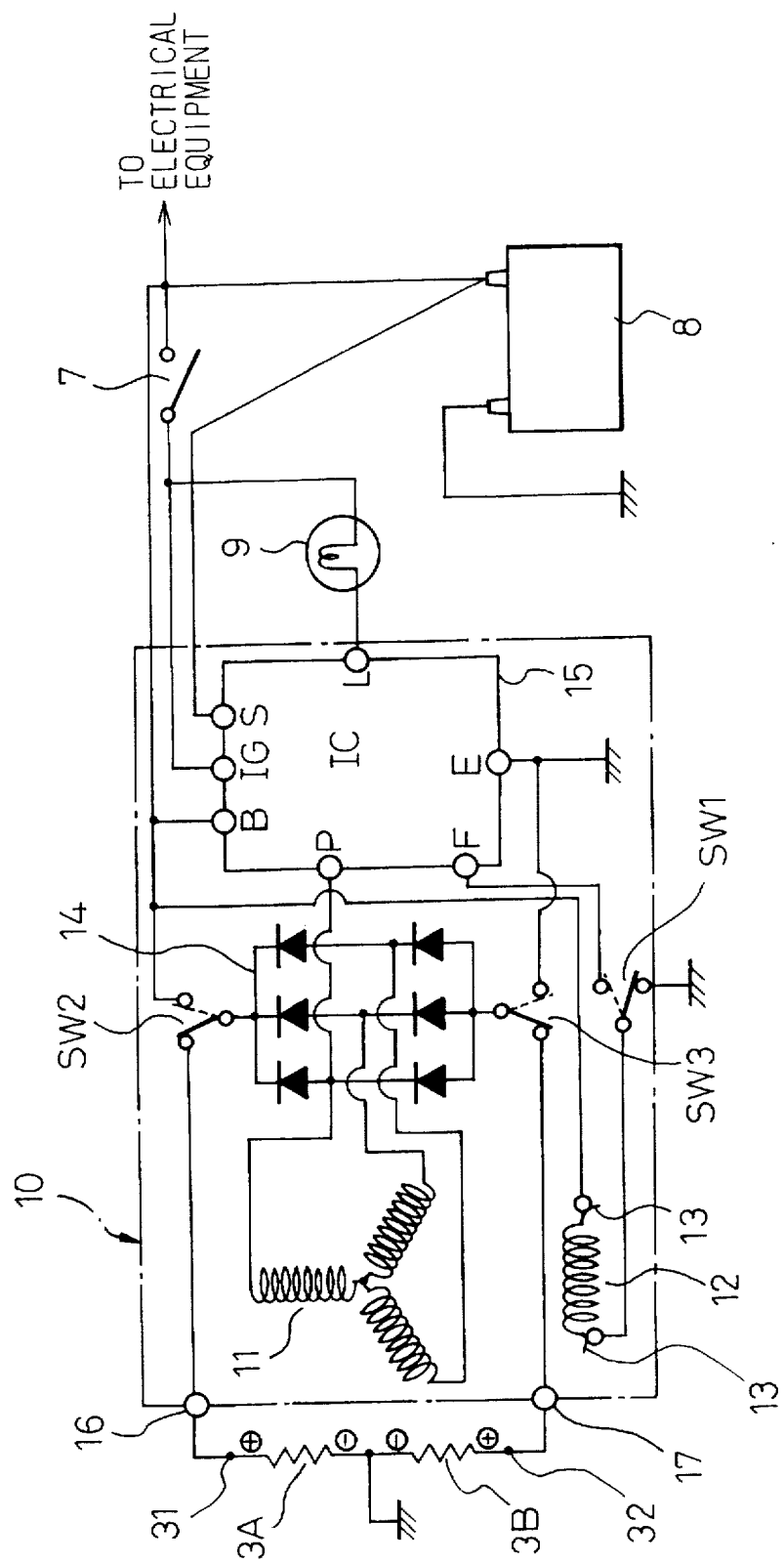
FIG. 4 is a circuit diagram illustrating the constitution of an apparatus for supplying electric power to heating devices of a vehicle according to an embodiment of the present invention.
Figure 5A:
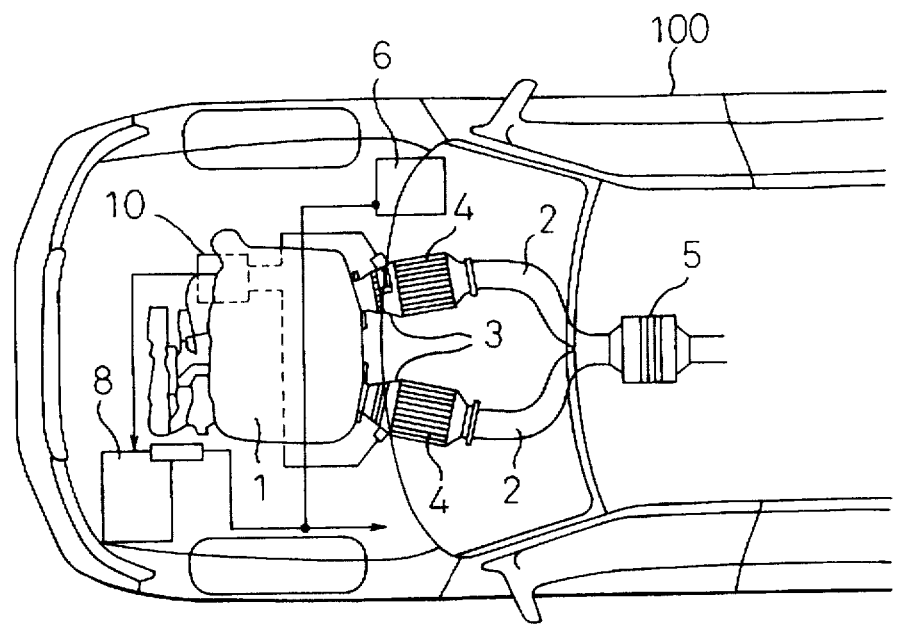
FIG. 5A is a perspective plan view of an automobile mounting an apparatus for supplying electric power to the heating devices in the exhaust gas passages of a V-type internal combustion engine in a vehicle according to an embodiment of the present invention.

FIG. 4 is a circuit diagram illustrating the constitution of an apparatus for supplying electric power to the heating devices of a vehicle according to an embodiment of the present invention. FIG. 5A is a perspective plan view of an automobile mounting an apparatus for supplying electric power to the heating devices in the exhaust gas passages of a V-type internal combustion engine in a vehicle according to an embodiment of FIG. 4, and FIG. 5B is a circuit diagram illustrating an electric connection between the alternator 10 and the electrically heated catalysts 4 of FIG. 5A.

Described below first with reference to FIG. 5A is a state where the apparatus for supplying electric power to the heating devices of a vehicle is mounted on the automobile 100 according to the embodiment of the present invention. The internal combustion engine 1 mounted on the automobile 100 according to this embodiment is of the V-type. Therefore, an exhaust gas passage 2 is provided for each of the banks of the V-type internal combustion engine. The two exhaust gas passages 2 meet together and are connected to the rear part of the automobile 100. The two exhaust gas passages 2 are provided with an ordinary catalytic converter 4, respectively. The combined exhaust gas passages are also provided with an ordinary catalytic converter 5. An electrically heated catalyst 3 is provided on the upstream side of the ordinary catalytic converter 4 in each exhaust gas passage.

In FIG. 5A, reference numeral 8 denotes a battery which is electrically charged by the output of the alternator 10 driven by the internal combustion engine 1. The output of the battery 8 is supplied to a variety of electric equipment mounted in the automobile 100 and to an ECU (engine control unit) 6 for controlling these electric equipment. The electrically heated catalysts 3 have so far been powered by the battery 8. According to this embodiment, however, the electrically heated catalysts 3 are directly connected to the alternator 10.

Figure 5B:
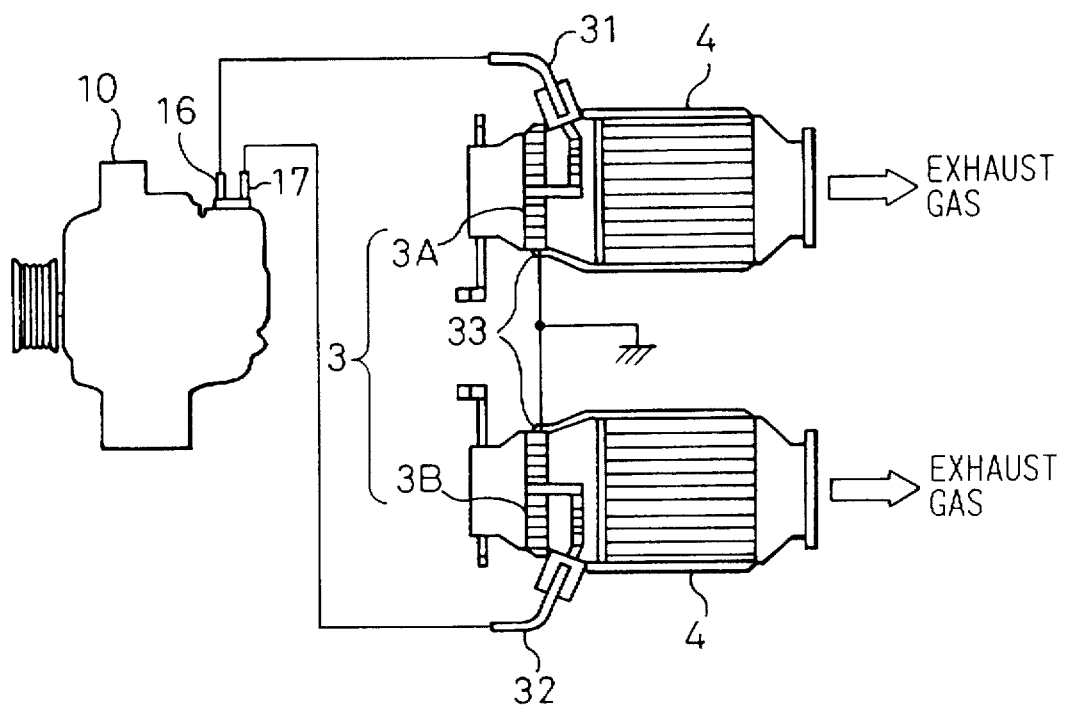
FIG. 5B is a circuit diagram illustrating an electric connection between the alternator and the electrically heated catalysts of FIG. 5A.

FIG. 5B is a diagram illustrating the electric connection of only the alternator 10 and the electrically heated catalysts 3. According to this embodiment as described above, the electrically heated catalysts 3 are so constituted that the outer cylinders 33 which are negative electrodes are grounded to the body. In this embodiment, therefore, the outer cylinders 33 which are negative electrodes of the two electrically heated catalysts 3A and 3B are grounded to the body of the automobile. Terminals 31 and 32 which are positive electrodes of the electrically heated catalysts 3A and 3B are connected to the additionally provided output terminals 16 and 17 of the alternator 10.

FIG. 4 is a circuit diagram illustrating the electric constitution of the alternator 10 and the electrically heated catalysts 3 shown in FIG. 5B together with the ignition switch 7, battery 8 and charge lamp 9.

In FIG. 4, the alternator 10 includes a stator coil 11, a rotor coil 12, brushes 13, a three-phase full-wave rectifier 14 made up of a diode bridge, an IC regulator 15, and change-over switches SW1 to SW3. The stator coil 11 is three-phase star-connected, and the outer terminals of these coils are connected to the three-phase full-wave rectifier 14 made up of a diode bridge. The change-over switches SW1 and SW2 are installed at the same positions as the change-over switches SW1 and SW2 explained with reference to FIG. 1. The change-over switch SW3 is newly provided between ground and a common anode of the three-phase full-wave rectifier 14.

Due to the change-over switch SW1, the terminal connected to one brush 13 of the rotor coil 12 is connected to either the terminal F of the IC regulator 15 or ground. Due to the change-over switch SW2, the common cathode of the three-phase full-wave rectifier 14 is connected to the charging terminal B of the IC regulator 15, to the battery 8 and to the other brush of the rotor coil, or to the output terminal 16 of the alternator 10. Due to the change-over switch SW3, furthermore, the common anode of the three-phase full-wave rectifier 14 is connected to either ground or the output terminal 17 of the alternator 10.

The IC regulator 15 has a charging terminal B, an ignition terminal IG connected to the ignition switch 7, a lamp terminal L connected to a charge lamp 9, a field current terminal F connected to the rotor coil 12, a phase terminal P connected to one of the phases of the stator coil 11, and an earth terminal E that is grounded. The other end of the charge lamp 9 is connected to the ignition switch 7, and the other end of the ignition switch 7 is connected to the battery 8 and to the electric circuit of the automobile. The terminal 31 of the electrically heated catalyst 3A is connected to the output terminal 16 of the alternator 10, and the terminal 32 of the electrically heated catalyst 3B is connected to the output terminal 17 of the alternator 10. Outer cylinders 33 of the electrically heated catalysts 3A and 3B are both grounded.

In this constitution, the two electrically heated catalysts 3A and 3B are connected in series between ground and the output terminals 16, 17 of the alternator. In order that the serial circuit exhibits the aforementioned optimum electric resistance of 0.5Ω, each of the electrically heated catalysts 3A and 3B must exhibit an electric resistance of 0.25Ω which is one-half 0.5Ω. With the presently available electrically heated catalyst equipped with a metal carrier, it is possible to halve the electric resistance, providing freedom in designing the circuit of electrically heated catalysts. Besides, halving the electric resistance of the electrically heated catalyst is advantageous from the standpoint of durability, making it possible to obtain an electrically heated catalyst maintaining freedom even from the standpoint of its structure.

Described below is the operation of the thus constituted apparatus for supplying electric power to the heating devices of the vehicle of when the battery 8 is being electrically charged and when the electric power is supplied to the electrically heated catalysts 3A and 3B.

(1) Operation for charging the battery.

The ignition switch 7 is turned on, and the change-over switches SW1 to SW3 are connected as shown by the dotted lines. In this state, the rotor coil 12 is connected to the battery 8 and to the terminal F of the IC regulator 15, and the field current is controlled by the IC regulator 15. The electric power generated in the stator coil 11 depending on the field current flowing into the rotor coil 12, is rectified through the three-phase full-wave rectifier 14 and is input to the battery 8 through the IC regulator 15 and is supplied to electric equipment mounted on the vehicle that are not shown. The charge lamp 9 turns on.

(2) Operation for supplying power to the electrically heated catalysts 3A and 3B.

Immediately after the start of the internal combustion engine by turning the ignition switch 7 on, the change-over switches SW1 to SW3 are connected as shown by the solid lines in response to an instruction from the ECU 6 explained with reference to FIG. 5A. In this state, an end of the rotor coil 12 is connected to the battery 8, the other end thereof is grounded, and the maximum field current flows into the rotor coil 12. The electric power generated in the stator coil 11, depending upon the field current flowing into the rotor coil 12, is rectified through the three-phase full-wave rectifier 14 and is output from the common cathode and from the common anode. The electric power output from the common cathode is supplied to the electrically heated catalyst 3A through the output terminal 16, and the electric power output from the common anode is supplied to the electrically heated catalyst 3B through the output terminal 17. Thus, the electric power generated by the alternator 10 can be utilized to the maximum degree. The charge lamp 9 is not turned on.

The constitution of the above-mentioned embodiment can be applied to even those of the type in which the electrically heated catalysts are not grounded to the body. Even when the resistor of the electrically heated catalyst is short-circuited to the body due to some cause, no inconvenience occurs since the two electrically heated catalysts are supplied with electric power from separate circuits.

Moreover, the rotor coil of the alternator may be powered directly by the output voltage of the alternator in addition to being powered by the battery. In this case, since the output voltage of the alternator is so high, it is desired to control the duty ratio so that the rotor coil will not be burned.

According to the present invention as described above, the electric power can be supplied from the alternator to only the electrically heated catalysts at the time of heating the electrically heated catalysts despite the electrically heated catalysts being mounted in a plural number on the vehicle without permitting an increase in the electric resistance of the electrically heated catalysts. Moreover, a maximum amount of electric power can be extracted from the alternator.

What is claimed is:

1. An apparatus for supplying electric power to two electrically heated catalysts attached to an exhaust gas passage of an engine of a vehicle to heat the two catalysts, wherein the vehicle includes a battery for supplying electric power to other loads, and an alternator driven by the engine to generate electricity, and wherein said alternator includes a stator coil, a rotor coil, a three-phase full-wave rectifier for rectifying an AC power generated in the stator coil, and an IC regulator for controlling the operation for charging said battery and a field current flowing into said rotor coil of which the one end is connected to said battery, wherein a common cathode terminal of said three-phase full-wave rectifier is connected to said battery, rotor coil and IC regulator, and a common anode terminal thereof is grounded, and wherein said alternator is provided with two output terminals and said two electrically heated catalysts are connected electrically in series between the two output terminals, the point of connection thereof being grounded, and the common cathode terminal and the common anode terminal of said three-phase full-wave rectifier are provided with first change-over switches which, in a first state, establish said ordinary connection state and, in a second state, connect said common cathode terminal and said common anode terminal to said two output terminals, respectively and wherein the apparatus further comprises a second change-over switch in a circuit that connects the other end of said rotor coil to a field current control terminal of said IC regulator, in order to ground said other end of said rotor coil in said second state.

* * * * *